US010281968B2

United States Patent
Hansalia et al.

(10) Patent No.: US 10,281,968 B2
(45) Date of Patent: May 7, 2019

(54) DETECTION OF NON-POWERED DEVICE (NON-PD) ON A POWER-OVER-ETHERNET PORT BASED ON THE DATA LINK STATE INFORMATION

(71) Applicant: ARRIS Enterprises LLC, Suwanee, GA (US)

(72) Inventors: Rakesh Hansalia, Milpitas, CA (US); Budda Sarath Chandra Reddy, Kurnool (IN)

(73) Assignee: ARRIS Enterprises LLC, Suwanee, GA (US)

( * ) Notice: Subject to any disclaimer, the term of this patent is extended or adjusted under 35 U.S.C. 154(b) by 107 days.

(21) Appl. No.: 15/337,496

(22) Filed: Oct. 28, 2016

(65) Prior Publication Data

US 2017/0322610 A1 Nov. 9, 2017

Related U.S. Application Data (60) Provisional application No. 62/333,806, filed on May 9, 2016.

(51) Int. Cl.
*G06F 1/00* (2006.01)
*G06F 1/26* (2006.01)
(Continued)

(52) U.S. Cl.
CPC ............ *G06F 1/266* (2013.01); *G06F 1/3296* (2013.01); *H04L 12/10* (2013.01)

(58) Field of Classification Search
CPC ....... G06F 1/266; G06F 1/3296; H04L 12/10; H04L 25/02; H04L 43/0811
See application file for complete search history.

(56) References Cited

U.S. PATENT DOCUMENTS 9,665,151 B1 5/2017 Zou et al.
2006/0153583 A1 7/2006 Yukutake et al.
(Continued)

FOREIGN PATENT DOCUMENTS

| CN | 101867468 | 4/2015 |
| JP | 2014207530 | 10/2014 |
| WO | 2009023695 | 2/2009 |

OTHER PUBLICATIONS

LAN/MAN Standards Committee, "Part 3: Carrier Sense Multiple Access with Collision Detection (CSMA/CD) Access Method and Physical Layer Specifications", IEEE Std 802.3at, 2009.
(Continued)

*Primary Examiner* — Xuxing Chen
(74) *Attorney, Agent, or Firm* — Stewart M. Wiener (57) ABSTRACT

Methods and systems are provided for accurately identifying devices coupled to ports of power sourcing equipment (PSE) of a Power over Ethernet (PoE) system as either powered devices (PDs) or non-powered devices (non-PDs). A device coupled to a PSE port can be identified as a non-PD in response to determining a data link is established on the port before enabling the detection of powered devices on the port and before supplying power on the port. Another embodiment includes determining that a device has been coupled to the port, determining that a data link to the device has been established on the port, removing power from the port, and then determining whether the data link established on the port still exists.

29 Claims, 4 Drawing Sheets (51) Int. Cl.
     *G06F 1/3296*     (2019.01)
     *H04L 12/10*      (2006.01)

(56) References Cited

U.S. PATENT DOCUMENTS

| | | |
|---|---|---|
| 2009/0023695 A1 | 1/2009 | Blye et al. |
| 2009/0063066 A1 | 3/2009 | Maggiolino |
| 2012/0011380 A1* | 1/2012 | Dove ............... H04L 12/10 |
| | | 713/300 |
| 2013/0339760 A1 | 12/2013 | Zimmerman et al. |
| 2014/0359320 A1 | 12/2014 | Hua et al. |
| 2014/0365805 A1* | 12/2014 | Balasubramanian ..... G06F 1/28 |
| | | 713/340 |

OTHER PUBLICATIONS

LAN/MAN Standards Committee, "Draft Standard for Ethernet Amendment: Power over Ethernet over 4 Pairs", IEEE P802.3bt (draft), 2017.

\* cited by examiner

FIG. 2B ing the detection of PDs on the port and before supplying power on the port; and (2) determining that a non-PD is coupled to the port in response to determining a data link is established on the port before enabling the detection of powered devices on the port and before supplying power on the port.

DETECTION OF NON-POWERED DEVICE (NON-PD) ON A POWER-OVER-ETHERNET PORT BASED ON THE DATA LINK STATE INFORMATION

RELATED APPLICATION

This application claims priority of U.S. Provisional Patent Application 62/333,806, entitled "Detection Of Non-powered Device (Non-PD) On A Power-Over-Ethernet Port Based On The Data Link State Information", which was filed on May 9, 2016, and is incorporated by reference herein.

FIELD OF THE INVENTION

The present invention relates to a method and system for detecting the presence of a non-powered device (Non-PD) on a power over Ethernet (PoE) port.

RELATED ART

Power over Ethernet (PoE) is defined by a family of Institute of Electrical and Electronics Engineers (IEEE) standards, namely IEEE 802.3af, IEEE 802.3at, and IEEE 802.3bt (draft). The standards define power sourcing equipment (PSE) as equipment that provides power over Ethernet cable. Similarly, standards define a powered device (PD) as a device that receives power over Ethernet cable from a PSE. Many conventional switches and routers implement PSE functions.

The above IEEE standards also define an electrical current method, called detection cycle, which allows a PSE to detect a PD that is connected to an Ethernet port of the PSE with an Ethernet cable. After a PSE detects a PD, the PSE provides power to the PD over the Ethernet cable. A PSE that does not detect a connected device as a PD during the detection cycle does not provide power to the connected device. Such devices are distinguished as non-powered devices (non-PDs). However, there are situations where real non-PDs are falsely detected as PDs, and the PSE erroneously provides power to these non-PDs. This may occur when the non-PD hardware is poorly designed, such that a non-PD poses as a PD to the PSE during the detection cycle. Any case of such false detection and subsequent power delivery to a non-PD is harmful to the non-PD.

There are other cases where real PDs are connected to the PSE, but these real PDs are externally powered so they really do not require power from the PSE. However, the PSE obviously detects these real PDs correctly as valid PDs and provides power to these PDs, regardless of the fact that these PDs are powered externally and do not really need power over Ethernet. PDs that are externally powered (so that they do not really require power from a PSE) are classified as non-PDs in the present specification. In some such situations, these externally powered PDs feed some of the power they receive from their external power supply back over the Ethernet cable to the PSE. This may lead to destabilization of the PoE plane of the PSE, resulting in power interruptions to other PDs that require power from the PSE for their operation.

There are no existing solutions to the above-described problems, since by fact the non-PDs appear to a PSE as valid PDs from the point of view of the IEEE standards, and by definition, it is outside of the IEEE standards to address this. It would therefore be desirable to have improved methods and structures to enable a PSE to correctly detect non-PDs and disable any power delivery to these detected non-PDs.

SUMMARY

Accordingly, the present invention provides a method for operating a port of a PSE in a PoE system, that includes: (1) determining whether a data link is established on the port before enabling the detection of PDs on the port and before supplying power on the port; and (2) determining that a non-PD is coupled to the port in response to determining a data link is established on the port before enabling the detection of powered devices on the port and before supplying power on the port.

In accordance with another embodiment, a method for operating a port of a PSE in a PoE system includes: (1) determining whether a data link is established on the port before enabling the detection of PDs on the port and before supplying power on the port; and (2) determining whether the port is in link aggregation with one or more sibling ports. If the port is not in link aggregation, and it is determined that a data link is established on the port before enabling the detection of powered devices on the port and before supplying power on the port, then it is determined that a non-powered device is coupled to the port. If it is determined that the port is in link aggregation, then it is determined whether any of the one or more sibling ports is coupled to a powered device. If none of the one or more sibling ports is coupled to a powered device, then the device is declared a non-powered device. If any of the one or more sibling ports is coupled to a powered device, then the detection of powered devices on the port is enabled, and power is supplied on the port.

In accordance with another embodiment, a method for operating a port of a PSE in a PoE system includes: (1) determining that a device has been coupled to the port; (2) determining that a data link to the device has been established on the port; and (3) removing power from the port, and then determining whether the data link established on the port still exists. If the data link on the port still exists, then the device coupled to the port is determined to be a non-powered device. If the data link on the port does not still exist, then enabling the detection of powered devices on the port and supplying power on the port.

In an alternate embodiment, if the data link on the port still exists, then it is determined whether the port is in link aggregation with one or more sibling ports. If so, then it is determined whether any of the one or more sibling ports is coupled to a powered device. If none of the one or more sibling ports is coupled to a powered device, then the device is declared a non-powered device. However, if any of the one or more sibling ports is coupled to a powered device, then the detection of powered devices on the port is enabled and power is supplied on the port.

In accordance with another embodiment, the present invention includes a PSE for a PoE system that includes a port, means for determining whether a data link is established on the port before enabling the detection of powered devices on the port and before supplying power on the port, and means for determining that a non-powered device is coupled to the port in response to determining a data link is established on the port before enabling the detection of powered devices on the port and before supplying power on the port. The PSE may also include means for enabling the detection of powered devices on the port and supplying power on the port in response to determining a data link is not established on the port.

In accordance with another embodiment, a PSE for a PoE system includes a port, means for determining whether a data link is established on the port before enabling the detection of powered devices on the port and before supplying power on the port, means for determining whether the port is in link aggregation with one or more sibling ports, and means for determining that a non-powered device is coupled to the port in response to determining a data link is established on the port before enabling the detection of powered devices on the port and before supplying power on the port, and determining that the port is not in link aggregation. The PSE may further include means for determining whether any of the one or more sibling ports is coupled to a powered device, means for declaring the device a non-powered device upon determining none of the one or more sibling ports is coupled to a powered device, and/or means for enabling the detection of powered devices on the port and supplying power on the port upon determining any of the one or more sibling ports is coupled to a powered device.

In accordance with another embodiment, a PSE in a PoE system includes a port, means for determining that a device has been coupled to the port, means for determining that a data link to the device has been established on the port, and means for removing power from the port, and then determining whether the data link established on the port still exists.

The PSE can further include means for determining that a non-powered device is coupled to the port in response to determining the data link on the port still exists, and/or means for enabling the detection of powered devices on the port and supplying power on the port in response to determining the data link on the port does not still exist.

In another embodiment, the PSE can include means for determining whether the port is in link aggregation with one or more sibling ports if the data link on the port still exists, and means for determining whether any of the one or more sibling ports is coupled to a powered device if the port is in link aggregation with one or more sibling ports. The PSE can further include means for declaring the device a non-powered device if none of the one or more sibling ports is coupled to a powered device and/or means for enabling the detection of powered devices on the port and supplying power on the port if any of the one or more sibling ports is coupled to a powered device.

The present invention will be more fully understood in view of the following description and drawings.

DETAILED DESCRIPTION

In a typical PoE connection between a PSE and a PD or a non-PD, a power plane defined by a PoE protocol and a data plane defined by a data link protocol are operated independent of each other. In accordance with one embodiment of the present invention, data plane information is used to determine whether a device coupled to a port of a PSE is a PD or a non-PD. That is, data plane information is used for making decisions regarding the power plane.

The present invention makes use of two corollaries associated with a conventional PoE system. First, the power plane between a PSE and a PD, and the data plane between the PSE and the PD are logically correlated, such that a valid data plane can only be established between the PSE and the PD if (and only if) the PSE provides power to the PD. Second, the power plane between the PSE and a non-PD, and the data plane between the PSE and the non-PD are logically correlated, such that a valid power plane is not required between the PSE and the non-PD for a data plane to be established between the PSE and the non-PD. In other words, the data plane between the PSE and the non-PD is established prior to the PSE starting the detection cycle on the associated port, and prior to delivering power on the associated port.

The two above-described corollaries can be effectively used to detect a non-PD, when a non-PD is connected to a port of a PSE prior to starting the detection cycle. That is, the presence of an established data plane on a port of the PSE prior to the detection cycle of the PSE indicates a non-PD is connected to the port. However, there are situations wherein a non-PD may not be properly detected if the non-PD is dynamically connected to a port of the PSE, e.g., after the PSE has implemented a detection cycle on the port. That is, after a detection cycle has been implemented on a port, and power has been supplied to the port, the presence of an established data plane is not determinative as to whether the device coupled to the port is a PD or a non-PD, as both are possible. (As described above, a poorly designed non-PD may be erroneously detected as a PD during a detection cycle, resulting in the non-PD being supplied power from the port of the PSE, and also having an established data plane.)

In accordance with one embodiment of the present invention, the following inverses of the two above-described corollaries are used to reliably detect non-PDs coupled to a port of a PSE. First, the power plane and the data plane between a PSE and a PD are logically correlated, such that after both a power plane and a data plane are established between a port of the PSE and the PD, if the PSE withdraws power from the port and severs the power plane, then a valid link previously established between the PSE and the PD will be severed. Second, the power plane and the data plane between a PSE and a non-PD are logically correlated, such that after both a power plane and a data plane are established between a port of the PSE and the non-PD, if the PSE withdraws power from the port and severs the power plane, then a valid data link previously established between the PSE and the non-PD will not be severed.

Thus, in accordance with one embodiment of the present invention, a PSE detects a non-PD connected on a PSE port as follows. When the PSE is configuring inline power on the port (prior to enabling detection cycles on the port), the PSE determines if a data link is already established on the port. If a data link is established on the port, then the PSE determines that a non-PD is connected to the port. If a data link is not established on the port, the PSE proceeds to enable hardware for performing detection cycles on the port.

After the hardware is enabled for performing detection cycles on the port, if a device is dynamically connected to the port, the following steps are performed. A data link is established on the port (either by a PD or a non-PD connected to the PSE port). The PSE then disables the hardware from delivering power to the device on the port. If the established data link is severed when power is removed from the port, then the device is identified as a PD. Conversely, if the established data link is not affected by removing power from the port, then the device is identified as a non-PD.

If the device is identified as a non-PD, the associated PSE port remains disabled (in hardware), so the PoE plane of the PSE is isolated from the power plane of the non-PD. However, if the device is identified as a PD, the associated PSE port is enabled (in hardware) for performing detection cycles and powering the PD.

Proper detection of a non-PD (and thus not providing power to the non-PD on the PSE port) in accordance with the present invention advantageously saves the end user from facing troubles related to conflicts between the power planes of the PSE and the non-PD. That is, if a non-PD is not detected correctly, then the PSE may inject power into the non-PD, potentially destroying the non-PD. Since a non-PD is externally powered (from a source other than the PSE), the power plane of a non-PD can also conflict with the power plane of a PSE by inadvertently injecting power back into the PSE, potentially destabilizing or bringing down the entire PSE power plane and thus affecting the PoE operation on the PSE. The present invention allows a PSE to correctly detect a non-PD quickly and isolate the PSE power plane from the power plane of the non-PD, thereby allowing for safe PoE operation with all kinds of devices, including PDs and non-PDs. The present invention is described in more detail below.

Figure 1A:
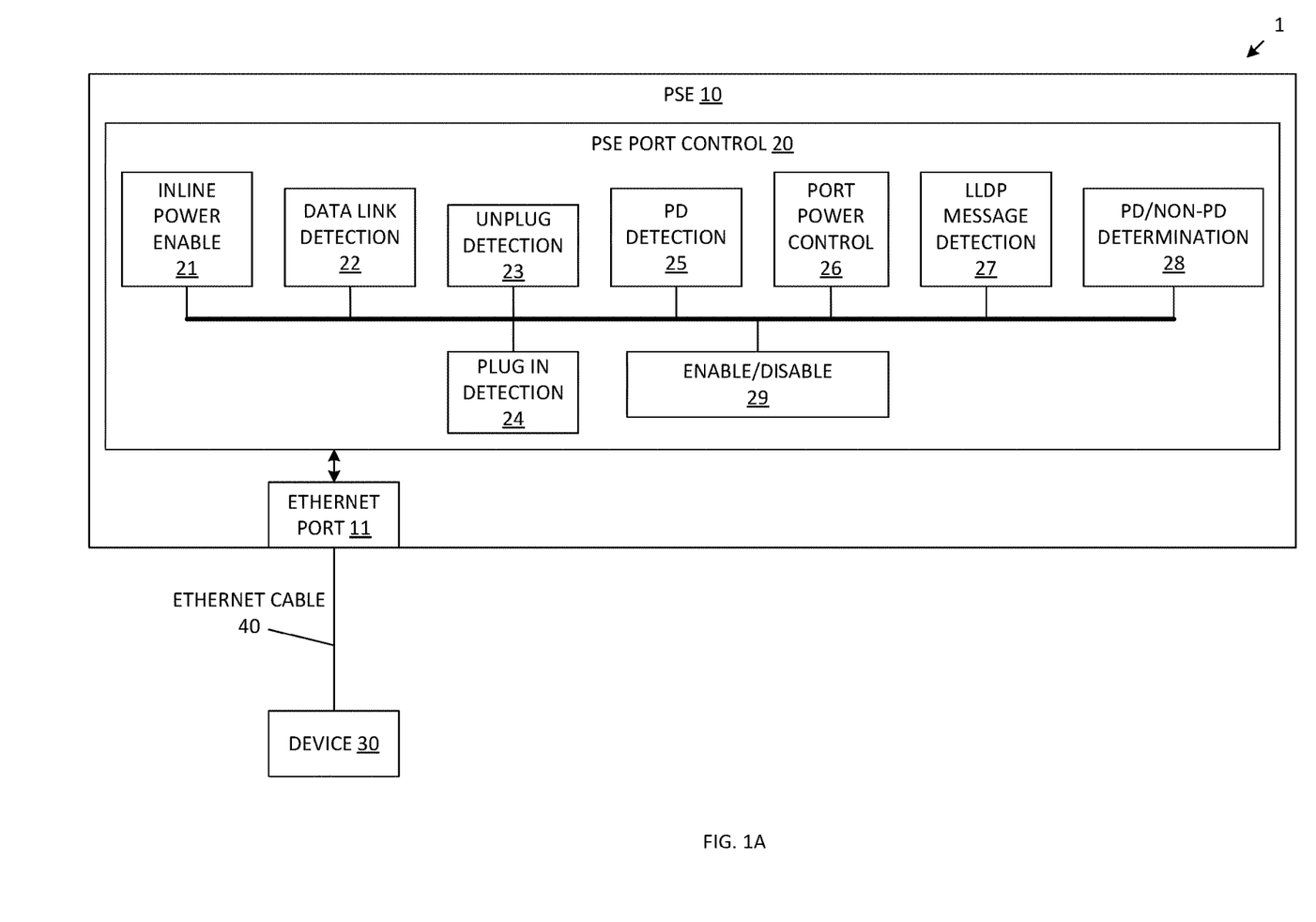
FIG. 1A is a block diagram of a PoE system that includes a PSE having PSE port control logic in accordance with one embodiment of the present invention.

FIG. 1A is a block diagram of a PoE system 1 that includes PSE 10, device 30 and Ethernet cable 40. PSE 10 includes PSE port control 20 and Ethernet port 11. PSE port control 20 includes inline power enable block 21, data link detection block 22, device unplug detection block 23, device plug-in detection block 24, PD detection cycle block 25, port power supply control block 26, link layer discovery protocol (LLDP) message detection block 27, PD/non-PD determination block 28 and enable/disable block 29. Although particular implementations of the various blocks 21-29 are described in more detail below, it is understood that these blocks may be implemented using software and/or hardware in various embodiments. That is, the various blocks 21-29 may be implemented using various processors, memory, logic and/or circuitry, which are not described in detail, but which could be readily designed by one of ordinary skill in view of the functional descriptions of these blocks provided below. Although only one port 11 is illustrated by FIG. 1A, it is understood that PSE 10 may include a plurality of ports, which are controlled in the same manner as port 11. Moreover, additional logic and circuitry typically included in a PSE, but not required for implementing the present invention, is not illustrated in FIG. 1A for clarity.

Figure 1B:
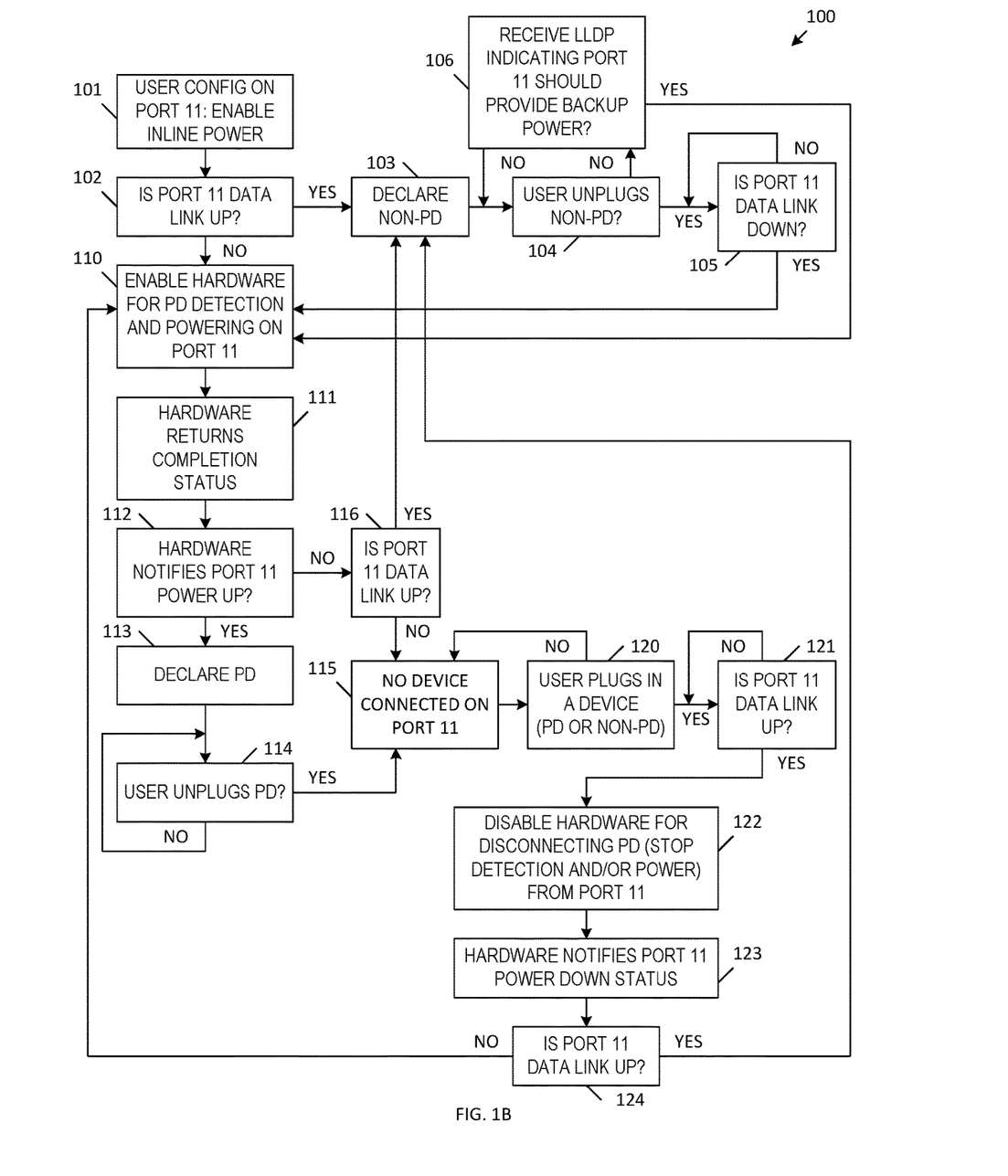
FIG. 1B is a flow diagram illustrating a method for operating the PoE system of FIG. 1A in accordance with one embodiment of the present invention.

FIG. 1B is a flow diagram 100 illustrating a method for operating the PoE system 1 in accordance with one embodiment of the present invention.

Initially, a user initiates configuration of port 11 of PSE 10 by enabling inline power on port 11 (FIG. 1B, 101). Note that this configuration means that port 11 is capable of providing (i.e., is allowed to provide) inline power to subsequently detected PDs. However, inline power is not actually provided on port 11 of the PSE 10 at this time. In one embodiment, the inline power on port 11 is enabled by inline power enable block 21 of PSE port control 20, which may be implemented, for example, by software.

Data link detection block 22 of PSE 10 then determines whether the data link associated with port 11 is up/active (FIG. 1B, 102). If so (102, Yes branch), then the PD/non-PD determination block 28 determines that the device 30 coupled to port 11 is a non-powered device (non-PD) (FIG. 1B, 103). In this instance, there is no need to do anything in the hardware of the PSE 10. That is, there is no need to enable the hardware of the PSE 10 to implement PD detection cycles, or to provide power on port 11.

After the device 30 coupled to port 11 has been declared a non-PD, the unplug detection block 23 determines whether the user has unplugged the non-PD (FIG. 1B, 104). If so (104, Yes branch), then data link detection block 22 determines whether the data link of port 11 is down (FIG. 1B, 105). If not (105, No branch), then processing loops back to (105). When the data link of port 11 goes down, (105, Yes branch), then processing proceeds to (110), wherein enable/disable control block 29 enables PD detection cycle block 25 to initiate periodic PD detection cycles on port 11, and enables port power control block 26 to provide power on port 11. The PD detection cycles are described in more detail below.

If the detected non-PD remains plugged into port 11 (104, No branch), then the LLDP message detection logic 27 determines whether the non-PD transmits a LLDP message to the port 11 that indicates the PSE 10 should be available to provide backup power to the non-PD (106). For example, certain devices, such as the Pugio H switch provided by Brocade Communications Systems, Inc. as model ICX6450-C12PD, normally operate as a non-PD that is supplied AC power from an external source. However, if the Pugio H switch is no longer supplied power from the external source, it is possible for the Pugio H switch to be powered from the PSE 10 (via PoE). In this case, it is desirable to configure port 11 of the PSE 10 as if it were connected to a PD. Thus, if the PSE 10 determines that the non-PD coupled to port 11 is a Pugio H switch (or an equivalent device) based on a received LLDP message (106, Yes branch), processing proceeds to (110), wherein the PD detection cycle logic 25 enables PD detection cycles and power on port 11. The PD detection cycles are described in more detail below.

Returning now to (102), if the data link associated with port 11 is not initially up/active (102, No branch), then enable/disable block 29 enables PD detection block 25 and port power control block 26. In response, PD detection block 25 implements a PD detection cycle, thereby determining whether a PD is connected to the associated port 11 (110). If a PD is detected on the port 11, then enable/disable block 29 causes port power control block 206 to supply power to port 11 (110). As described above, (110) can also be entered from either (105) or (106). The manner of implementing the PD detection cycle and providing power to the port 11 (if necessary) is defined by the above-mentioned IEEE standards. The PD detection block 25 and the port power control block 26 return a completion status of the PD detection cycle (111), which indicates whether power has been supplied to port 11.

If power has not been supplied to port 11 (112, No branch) (i.e., no PD was detected on port 11), then data link detection block 22 determines whether the data link associated with port 11 up/active (116). If so (116, Yes branch), then the device 30 coupled to port 11 is declared a non-PD (103) by PD/non-PD determination block 28. If not (116, No branch), then the PD/non-PD determination block 28 determines there is no device connected on port 11 (115).

If power has been supplied to port 11 (112, Yes branch), then the device 30 coupled to port 11 is declared a powered device (PD) by PD/non-PD determination block 28 (113). The unplug detection block 23 then determines whether the user has unplugged the PD (114). If not (114, No branch), then processing loops back to (114). If the user unplugs the PD from port 11 (114, Yes branch), then the PD/non-PD determination block 28 determines there is no device connected on port 11 (115).

Turning now to (115), if no device is connected on port 11, the plug-in detection block 24 determines whether a user has dynamically plugged a device into port 11 (120). If not, processing loops back to (115). If the plug-in detection block 24 determines that a device has been plugged into port (120, Yes branch), then data link detection block 22 determines whether the port 11 data link is up/active (121). If not, processing loops back to (121). Eventually, the data link on port 11 will come up/become active (121, Yes branch). Note that the data link on port 11 will automatically come up (without powering port 11) if the device coupled to port 11 is a non-PD. Alternately, the data link on port 11 will come up if the device coupled to port 11 is a PD, because the PD detection block 25 was previously enabled to (periodically) implement PD detection cycles (and port power control block 26 is enabled to provide power on port 11 upon detecting a PD) in (110). Note that these periodic PD detection cycles are specified by the above-mentioned IEEE standards.

After the data link for port 11 is up (121, Yes branch), it is not clear whether the device plugged into port 11 is a PD or a non-PD (for reasons set forth above). To make this determination, the PD detection block 25 and the port power control block 26 associated with port 11 are disabled (122) by enable/disable block 29, thereby removing any power supplied to port 11. Under these conditions, a PD coupled to port 11 will be disabled. That is, the data link associated with a PD coupled to port 11 will go down when power is removed from port 11 during (122). Note that the data link associated with a non-PD coupled to port 11 will remain up/active when power is removed from port 11 during (122). The PSE hardware provides a notification that indicates the status of port 11 after the power has been removed from port (123). Based on this notification, data link detection block 22 determines whether the port 11 data link is up/active (124). If the port 11 data link is up/active at this time (124, Yes branch), then the PD/non-PD determination block 28 determines that a non-PD is coupled to port 11 (103). However, if the port 11 data link is down at this time (124, No branch), then the PD/non-PD determination block 28 determines the device 30 is a valid PD and proceeds to (110), wherein the enable/disable block 29 enables the PD detection block 25 and the port power control block 26. This process enables the PSE 10 to correctly identify whether the device dynamically coupled to port 11 is a PD or a non-PD.

In accordance with an alternate embodiment, the above-described method and apparatus is modified to handle the case wherein aggregated links are used to provide a connection between a PSE and a PD/non-PD. In an aggregated link configuration, multiple links (e.g., multiple Ethernet cables) provide an aggregated connection between multiple ports of a PSE and multiple ports of a PD/non-PD. In the aggregated link configuration (which is defined by the above-mentioned IEEE standards), all of the links in the same aggregation are either coupled to the same PD, or are coupled to all non-PDs. Thus, in the method of the present embodiment, all links in the same aggregation are either declared as PDs or non-PDs.

Figure 2A:
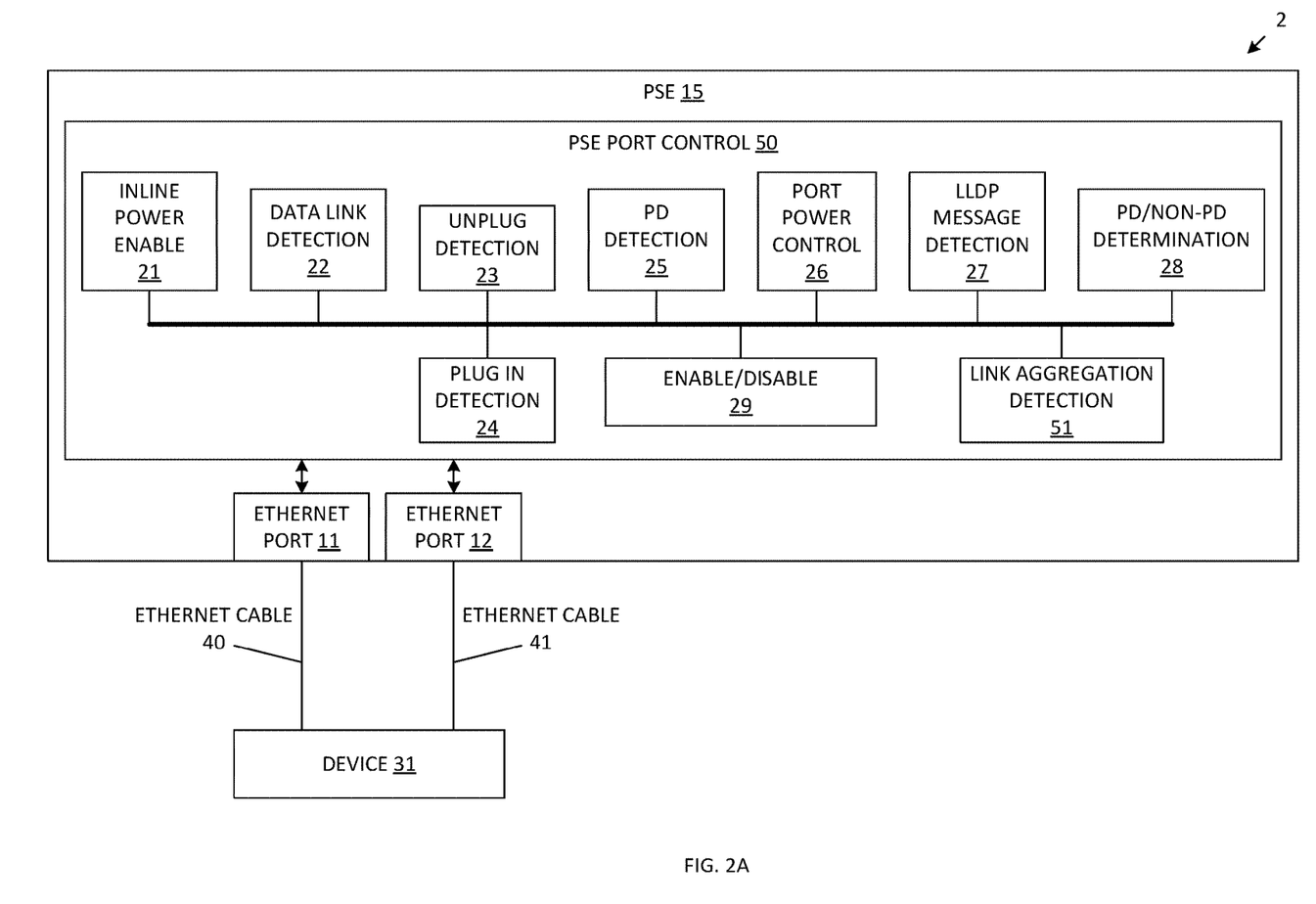
FIG. 2A is a block diagram of a PoE system that includes a PSE having PSE port control logic for handling an aggregated link configuration in accordance with one embodiment of the present invention.

FIG. 2A is a block diagram of a PoE system 2 that includes PSE 15 and device 31, which are connected in an aggregated link configuration using Ethernet cables 40-41. PSE 15 includes PSE port control 50 and Ethernet ports 11-12. Because PSE port control 50 (FIG. 2A) is similar to PSE port control 10 (FIG. 1A), similar elements in PSE port control 50 and PSE port control 10 are labeled with similar reference numbers. Thus, PSE port control 50 includes inline power enable block 21, data link detection block 22, device unplug detection block 23, device plug in detection block 24, PD detection cycle block 25, port power control block 26, LLDP message detection block 27, PD/non-PD determination block 28 and enable/disable block 29, which have been described above in connection with FIG. 1A. In addition, PSE port control 50 includes link aggregation detection block 51. Although two ports 11-12 are connected to device 31 in an aggregated link configuration in the embodiment of FIG. 2A, it is understood that other numbers of ports can be used to implement an aggregated link configuration in other embodiments.

Figure 2B:
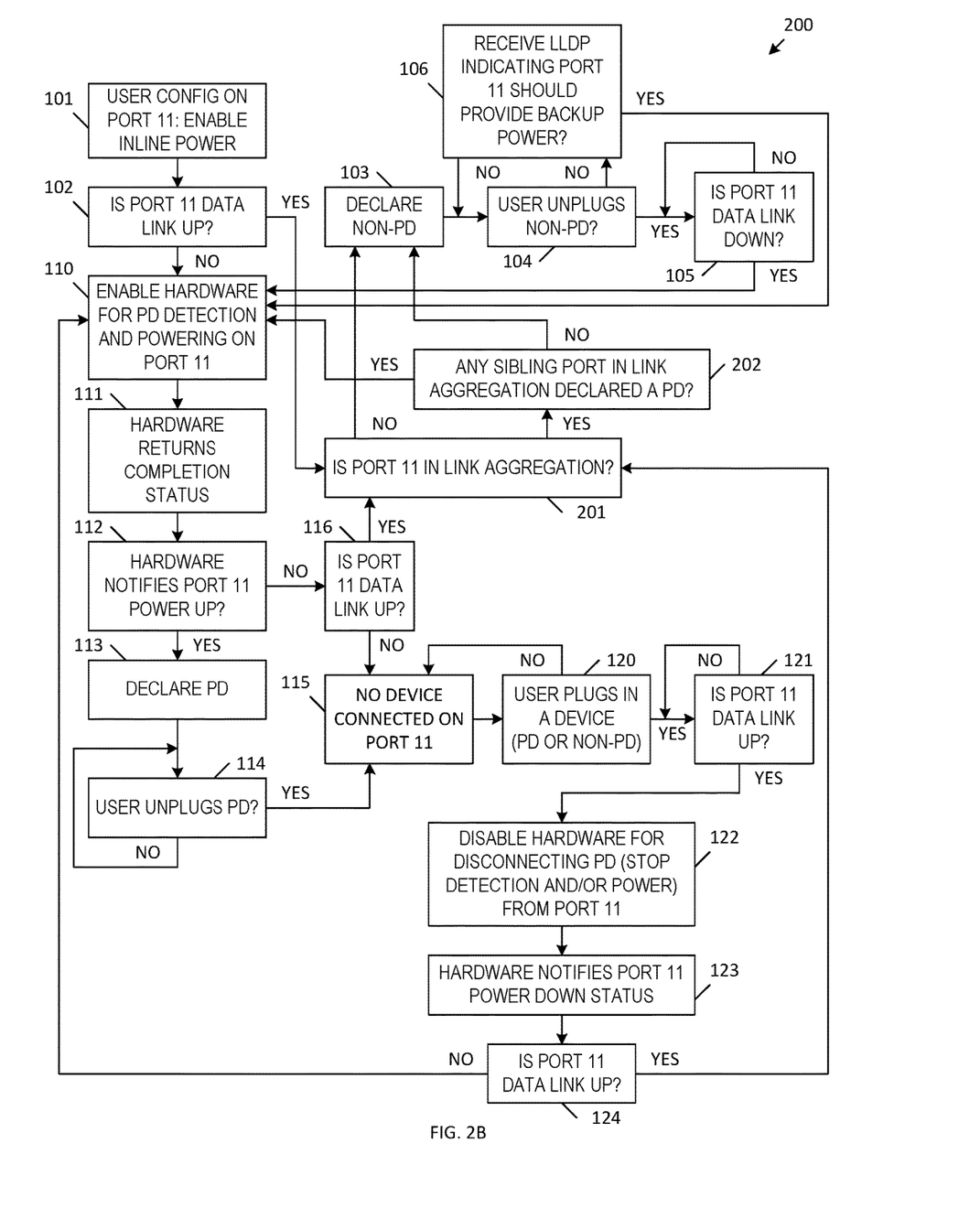
FIG. 2B is a flow diagram illustrating a method for operating the PoE system of FIG. 2A in accordance with one embodiment of the present invention.

FIG. 2B is a flow diagram that illustrates a method 200 that identifies PDs and non-PDs in a PSE that implements aggregated links. Because method 200 is similar to method 100, similar elements are labeled with similar reference numbers in FIGS. 1B and 2B. Thus, method 200 includes the procedures 101-106, 110-116 and 120-124, which are described above in connection with FIG. 1B. In addition, method 200 includes procedures 201 and 202, which are described in more detail below.

After initially determining that the port 11 data link is up/active in (102, Yes branch), but before declaring the device connected to the port 11 is a non-PD in (103), link aggregation detection block 51 determines whether port 11 is in link aggregation (201). That is, link aggregation detection block 51 determines whether port 11 has been configured to provide a connection with another port (e.g., port 12) in an aggregated link configuration to a device (e.g., device 31). In one embodiment, link aggregation detection block 51 maintains the link aggregation state information of the ports 11-12 in software based on a static configuration of link aggregation or a dynamically generated state of link aggregation based on the link aggregation control protocol (LACP) of the IEEE standard. If port 11 is not in link aggregation (201, No branch), then the device coupled to port 11 is declared a non-PD (103) by PD/non PD determination block 28. If port 11 is in link aggregation, (201, Yes branch), then link aggregation detection block 51 determines whether any sibling port in the link aggregation (e.g., port 12) has been determined to be connected to a PD (202). If a sibling port in the link aggregation has been determined to be connected to a PD (202, Yes branch), then the device connected to port 11 cannot be declared a non-PD. In this case, processing proceeds to (110), wherein a PD detection cycle is initiated for port 11. If no sibling port in the link aggregation has been declared to be connected to a PD (202, No branch), then the device coupled to port 11 is declared a non-PD (103) by PD/non-PD determination block 28.

Similarly, after determining that the port 11 data link is up/active in (116, Yes branch), but before declaring that the device 31 is a non-PD in (103), link aggregation detection block 51 determines whether port 11 is in link aggregation (201). If port 11 is not in link aggregation (201, No branch), then the device 31 coupled to port 11 is declared a non-PD (103) by PD/non-PD determination block 28. If port 11 is in link aggregation, (201, Yes branch), then link aggregation detection block 51 determines whether any sibling port in the link aggregation (e.g., port 12) has been declared to be coupled to a PD (202). If a sibling port in the link aggregation has been declared to be coupled to a PD (202, Yes branch), then the device connected to port 11 cannot be declared a non-PD. In this case, processing proceeds to (110), wherein another PD detection cycle is initiated for port 11. If no sibling port in the link aggregation has been declared to be a PD (202, No branch), then the device coupled to port 11 is declared a non-PD (103) by PD/non-PD determination block 28.

Similarly, after determining that the port 11 data link is up/active in (124, Yes branch), but before declaring a non-PD in (103), link aggregation detection block 51 determines whether port 11 is in link aggregation (201). If port 11 is not in link aggregation (201, No branch), then the device coupled to port 11 is declared a non-PD (103) by PD/non-PD determination block 28. If port 11 is in link aggregation, (201, Yes branch), then link aggregation detection block 51 determines whether any sibling port in the link aggregation has been declared to be connected to a PD (202). If a sibling port in the link aggregation has been declared to be connected to a PD (202, Yes branch), then port 11 cannot be declared to be connected to a non-PD. In this case, processing proceeds to (110), wherein another PD detection cycle is initiated for port 11. If no sibling port in the link aggregation has been declared to be a PD (202, No branch), then the device coupled to port 11 is declared a non-PD (103) by PD/non-PD determination block 28. In the foregoing manner, method 200 allows for the correct identification of PDs and non-PDs in a PSE that implements aggregated links.

Although the present invention has been described in connection with several embodiments, it is understood that other embodiments are possible, and would fall within the scope of the present invention. Thus, the present invention is limited only by the following claims.

We claim:

1. A method for operating a port of power sourcing equipment (PSE) in a power over Ethernet (PoE) system, comprising:
   determining whether a data link is established on the port before enabling the detection of powered devices on the port and before supplying power on the port;
   determining that a non-powered device is coupled to the port in response to determining a data link is established on the port before enabling the detection of powered devices on the port and before supplying power on the port;
   preventing power from being supplied on the port based on determining that the non-powered device is coupled to the port; and
   not enabling the detection of powered devices on the port based on determining that the non-powered device is coupled to the port.

2. The method of claim 1, further comprising enabling the detection of powered devices on the port and supplying power on the port in response to determining a data link is not established on the port.

3. The method of claim 1, further comprising:
   receiving a message on the data port from the non-powered device, wherein the message indicates the PSE should provide backup power to the non-powered device;
   supplying power on the port based on receiving the message; and
   enabling the detection of powered devices on the port based on receiving the message.

4. The method of claim 1, further comprising:
   detecting that the non-powered device is unplugged from the port;
   determining that the data link on the port is inactive after detecting the non-powered device is unplugged from the port; and
   supplying power on the port based on determining the data link on the port is inactive; and
   enabling the detection of powered devices on the port based on determining the data link on the port is inactive.

5. A method for operating a port of power sourcing equipment (PSE) in a power over Ethernet (PoE) system, comprising:
   determining whether a data link is established on the port before enabling the detection of powered devices on the port and before supplying power on the port;
   determining whether the port is in link aggregation with one or more sibling ports;
   determining that a non-powered device is coupled to the port in response to determining a data link is established on the port before enabling the detection of powered devices on the port and before supplying power on the port, and determining that the port is not in link aggregation;
   preventing power from being supplied on the port based on determining that the non-powered device is coupled to the port; and
   not enabling the detection of powered devices on the port based on determining that the non-powered device is coupled to the port.

6. The method of claim 5, further comprising, upon determining that the port is in link aggregation with one or more sibling ports, determining whether any of the one or more sibling ports is coupled to a powered device.

7. The method of claim 6, wherein if none of the one or more sibling ports is coupled to a powered device, then preventing power from being supplied on the port, and not enabling the detection of powered devices on the port.

8. The method of claim 6, wherein if any of the one or more sibling ports is coupled to a powered device, then enabling the detection of powered devices on the port and supplying power on the port.

9. A method for operating a port of power sourcing equipment (PSE) in a power over Ethernet (PoE) system, comprising:
   determining that a device has been coupled to the port;
   determining that a data link to the device has been established on the port;
   removing power from the port, and then determining whether the data link established on the port still exists while power is removed from the port; and
   returning power to the port in response to determining that the data link established on the port does not exist while power is removed from the port.

10. The method of claim 9, further comprising not returning power to the port in response to determining the data link established on the port still exists while power is removed from the port.

11. The method of claim 9, further comprising enabling the detection of powered devices on the port in response to determining the data link on the port does not still exist.

12. The method of claim 9, wherein if the data link on the port still exists, then determining whether the port is in link aggregation with one or more sibling ports.

13. The method of claim 12, wherein if the port is in link aggregation with one or more sibling ports, then determining whether any of the one or more sibling ports is coupled to a powered device.

14. The method of claim 13, wherein if none of the one or more sibling ports is coupled to a powered device, then declaring the device a non-powered device.

15. The method of claim 13, wherein if any of the one or more sibling ports is coupled to a powered device, then enabling the detection of powered devices on the port and supplying power on the port.

16. The method of claim 9, further comprising performing the following prior to determining that a device has been coupled to the port:
   supplying power on the port;
   enabling periodic detection of powered devices on the port; and then
   determining that no device is coupled to the port.

17. Power sourcing equipment (PSE) for a power over Ethernet (PoE) system, comprising:
   a port;
   means for determining whether a data link is established on the port before enabling the detection of powered devices on the port and before supplying power on the port;
   means for determining that a non-powered device is coupled to the port in response to determining a data link is established on the port before enabling the detection of powered devices on the port and before supplying power on the port;
   means for preventing power from being supplied on the port based on determining that the non-powered device is coupled to the port; and
   means for not enabling the detection of powered devices on the port based on determining that the non-powered device is coupled to the port.

18. The PSE of claim 17 further comprising means for enabling the detection of powered devices on the port and supplying power on the port in response to determining a data link is not established on the port.

19. Power sourcing equipment (PSE) for a power over Ethernet (PoE) system, comprising:
   a port;
   means for determining whether a data link is established on the port before enabling the detection of powered devices on the port and before supplying power on the port;
   means for determining whether the port is in link aggregation with one or more sibling ports; and
   means for determining that a non-powered device is coupled to the port in response to determining a data link is established on the port before enabling the detection of powered devices on the port and before supplying power on the port, and determining that the port is not in link aggregation;
   means for preventing power from being supplied on the port based on determining that the non-powered device is coupled to the port; and
   means for not enabling the detection of powered devices on the port based on determining that the non-powered device is coupled to the port.

20. The PSE of claim 19, further comprising means for determining whether any of the one or more sibling ports is coupled to a powered device.

21. The PSE of claim 20, further comprising means for means for preventing power from being supplied on the port, and not enabling the detection of powered devices on the port upon determining none of the one or more sibling ports is coupled to a powered device.

22. The PSE of claim 20, further comprising means for enabling the detection of powered devices on the port and supplying power on the port upon determining any of the one or more sibling ports is coupled to a powered device.

23. Power sourcing equipment (PSE) in a power over Ethernet (PoE) system, comprising:
   a port;
   means for determining that a device has been coupled to the port;
   means for determining that a data link to the device has been established on the port;
   means for removing power from the port, and then determining whether the data link established on the port still exists while power is removed from the port; and
   means for returning power to the port in response to determining that the data link established on the port does not exist while power is removed from the port.

24. The PSE of claim 23, further comprising means for not returning power to the port in response to determining the data link established on the port still exists while power is removed from the port.

25. The PSE of claim 23, further comprising means for enabling the detection of powered devices on the port in response to determining the data link on the port does not still exist.

26. The PSE of claim 23, further comprising means for determining whether the port is in link aggregation with one or more sibling ports if the data link on the port still exists.

27. The PSE of claim 26, further comprising means for determining whether any of the one or more sibling ports is coupled to a powered device if the port is in link aggregation with one or more sibling ports.

28. The PSE of claim 27, further comprising means for declaring the device a non-powered device if none of the one or more sibling ports is coupled to a powered device.

29. The PSE of claim 27, further comprising means for enabling the detection of powered devices on the port and supplying power on the port if any of the one or more sibling ports is coupled to a powered device.

* * * * *